United States Patent
Fruit et al.

(10) Patent No.: US 11,276,324 B2
(45) Date of Patent: Mar. 15, 2022

(54) METHOD AND DEVICE FOR PREDICTING OPTIMUM ATTACK AND DEFENCE SOLUTIONS IN A MILITARY CONFLICT SCENARIO

(71) Applicant: MBDA France, Le Plessis Robinson (FR)

(72) Inventors: Ronan Fruit, Le Plessis-Robinson (FR); David Vigouroux, Le Plessis-Robinson (FR); Stéphane Le Menec, Le Plessis-Robinson (FR); Charlotte Touchard, Le Plessis-Robinson (FR); Alexandre Kotenkoff, Le Plessis-Robinson (FR); Mathias Formoso, Le Plessis-Robinson (FR)

(73) Assignee: MBDA France, Le Plessis Robinson (FR)

( * ) Notice: Subject to any disclaimer, the term of this patent is extended or adjusted under 35 U.S.C. 154(b) by 308 days.

(21) Appl. No.: 16/489,998

(22) PCT Filed: Feb. 19, 2018

(86) PCT No.: PCT/FR2018/000031
§ 371 (c)(1),
(2) Date: Aug. 29, 2019

(87) PCT Pub. No.: WO2018/158510
PCT Pub. Date: Sep. 7, 2018

(65) Prior Publication Data
US 2019/0385473 A1    Dec. 19, 2019

(30) Foreign Application Priority Data
Mar. 3, 2017    (FR) .................................. 1700216

(51) Int. Cl.
*G09B 9/00*     (2006.01)
*F41G 3/26*     (2006.01)

(52) U.S. Cl.
CPC ............... *G09B 9/003* (2013.01); *F41G 3/26* (2013.01)

(58) Field of Classification Search
CPC ............. F41G 3/26; G09B 9/00; G09B 9/003
See application file for complete search history.

(56) References Cited

U.S. PATENT DOCUMENTS

| | | |
|---|---|---|
| 6,497,169 B1 | 12/2002 | Khosla |
| 7,194,353 B1 | 3/2007 | Baldwin et al. |

(Continued)

FOREIGN PATENT DOCUMENTS

| | | |
|---|---|---|
| EP | 2765544 A1 | 8/2014 |
| EP | 2765545 A1 | 8/2014 |

(Continued)

OTHER PUBLICATIONS

International Search Report dated May 7, 2018, issued in corresponding International Application No. PCT/FR2018/000031, filed Feb. 19, 2018, 9 pages.

(Continued)

*Primary Examiner* — Timothy A Musselman
(74) *Attorney, Agent, or Firm* — Christensen O'Connor Johnson Kindness PLLC

(57) ABSTRACT

A prediction device includes a data input assembly, a modelling unit, a resolution unit, an interpretation unit, and an information transmission unit. The data input assembly is configured to enter attacker data relating to attack models, and defender data relating to ground a zone to be defended and to available defense means. The modelling unit is configured to generate a game tree evaluated on the basis of input data, based on game theory. The resolution unit is (Continued)

configured to define a game balance based on game theory, the game balance defining an attacker strategy and defender strategy pair. The interpretation unit is configured to determine, on the basis of the game balance, an optimum attack solution, as well as an optimum defense solution that is best suited to the optimum attack solution.

6 Claims, 3 Drawing Sheets

(56) References Cited

U.S. PATENT DOCUMENTS

| | | |
|---|---|---|
| 9,177,259 B1 | 11/2015 | Levchuk |
| 9,524,358 B1 | 12/2016 | Rutkowski et al. |
| 2005/0183596 A1 | 8/2005 | Solomon |
| 2015/0054826 A1 | 2/2015 | Varga |
| 2015/0363734 A1 | 12/2015 | Leboucher et al. |
| 2015/0377596 A1 | 12/2015 | Leboucher et al. |
| 2016/0341531 A1 | 11/2016 | Kotenkoff et al. |

FOREIGN PATENT DOCUMENTS

| | | |
|---|---|---|
| EP | 2887277 A1 | 6/2015 |
| EP | 2899491 A1 | 7/2015 |
| FR | 2767770 A1 | 3/1999 |
| FR | 2975784 A1 | 11/2012 |
| FR | 2987108 A1 | 8/2013 |
| FR | 3015023 A1 | 6/2015 |

OTHER PUBLICATIONS

Written Opinion of the International Searching Authority dated May 7, 2018, issued in corresponding International Application No. PCT/FR2018/000031, filed Feb. 19, 2018, 8 pages.

Naseem, A. et al., "Real-time Decision Support System for Resource Optimization & Management of Threat Evaluation and Weapon Assignment Engineering in Air Defence," 2014 IEEE International Conference on Industrial Engineering and Engineering Management, Dec. 2014, pp. 565-569, XP032744600.

Written Opinion of the International Searching Authority dated May 7, 2018, issued in corresponding International Application No. PCT/FR2018/000031, filed Feb. 19, 2018, 7 pages.

International Preliminary Report on Patentability dated Sep. 3, 2019, issued in corresponding International Application No. PCT/FR2018/000031, filed Feb. 19, 2018, 1 page.

METHOD AND DEVICE FOR PREDICTING OPTIMUM ATTACK AND DEFENCE SOLUTIONS IN A MILITARY CONFLICT SCENARIO

The present invention relates to a method and a device for predicting optimal attack and defence solutions in a military conflict scenario.

The present invention applies to the military field, and more specifically, although not exclusively, in situations where command and control (C2) systems intervene, which manage, in particular, an allocation of weapons to threats. In the military field, defending a given zone facing an enemy offensive aims to best allocate available resources to deal with threats by maximising the hope of survival of the strategic points defended. According to threats, the system C2 determines an engagement solution by considering operational and technical criteria, in particular in the context of an air defence weapons system.

It is known that air defence weapons systems are constituted of sensors, launchers, and an operational command centre of type C2, wherein operators can interact with the system and monitor it. The operational command centre predicts trajectories of attackers and uses this prediction to plan defending the potential objectives of assailants. It seeks to find the best defence possible for the system facing an attack scenario.

Predicting trajectories of attackers is made particularly complex, because of three factors:
- a high uncertainty affects the subsequent behaviour of the attacker, and the further it is visualised into the future, the more this real behaviour is unknown;
- most attackers (fighter aircraft, missiles, etc.) have capacities for significant manoeuvres and can therefore quickly change path (change of course, of altitude, etc.);
- attack trajectories, and in particular final manoeuvres to rally the objectives, are selected to fault the defence system, and are therefore difficult to predict by the operational command centre.

The information available to predict the trajectories comes, on the one hand, from sensors, in particular radars, which provide the path travelled by the attackers with uncertainties on the measurements, and on the other hand, from the knowledge that the system and the operator have the assailant type and attack missions which can be met.

The present invention seeks to predict a defence solution implemented by the defender to protect itself best from attack and/or, by placing itself on the side of the attacker, an optimal attack solution implemented by the attacker.

The present invention more specifically relates to a method for predicting an optimal attack solution and a corresponding optimal defence solution, in a military conflict scenario (at least potential) between an attacker and a defender.

According to the invention, said prediction method comprises:
- a data input step, implemented by a data input assembly, consisting of entering, at least initially before the implementation of the method, both for attacker data relating to at least the attack models, and defender data relating to at least one zone to be defended and available defence means;
- a scenario modelling step, implemented by a modelling unit, consisting of generating a game tree evaluated on the basis of said input data in the context of the game theory;
- a resolution step, implemented by a resolution unit, consisting of defining a game balance in the context of the game theory, a balance defining an attacker strategy and defender strategy pair;
- an interpretation step, implemented by an interpretation unit, consisting of determining, on the basis of the game balance, an optimal attack solution and an optimal defence solution, best suited to this optimal attack solution; and
- an information transmission step, implemented by an information transmission unit, consisting of transmitting to an operator or a user system, at least said optimal attack solution and said optimal defence solution.

The method according to the invention thus makes it possible to predict optimal solutions making it possible, in particular, to define, if it is placed on the side of the defender, an optimal defence solution, and if it is placed on the side of the attacker, an optimal attack solution.

Predicting these optimal solutions (attack and defence) in the conflict scenario is based on the resolution of a game theory problem, as specified below. The game theory makes it possible to analyse the situation wherein the optimal action for an officer depends on predictions that they form on the decision of another officer. These two officers are the attacker and the defender in the context of the present invention.

In the game theory, a game balance, in particular a balance termed Nash equilibrium, is a situation in a game where no player has any interest in changing strategy. In this situation, all of the choices made by several players, knowing their reciprocal strategies, become stable due to the fact that none can be modified, only their strategy without weakening their personal position.

Advantageously, the attacker data comprises at least some of the following data:
- attack procedure models, for example, attack trajectories;
- threat types and associated features;
- at least one detected appearance position of a threat;
- at least one assumed appearance position of a threat; and
- preferences of the attacker.

Furthermore, advantageously, the defender data comprises at least some of the following data:
- possible missions;
- detection means data;
- detection means features;
- potential target positions in the zone to be defended;
- defence capacities of the zone to be defended; and
- preferences of the defender.

Of the attacker data and defender data, there can be known and certain data, or assumed data, which cannot be completely accurate, in particular according to who, between the attacker or the defender, predicts it. Thus, if the prediction method is used to plan an attack, the data and the parameters of the attacker are accurately known as an attacker, but the defender data which is had is uncertain. Conversely, if the prediction method is used to plan a defence, the data and the parameters of the defender are known as a defender. However, the attacker data is not or is hardly accessible. This data is indeed theories, expert opinions, elements coming from military information, etc. The data therefore comprises presumed beliefs of the adversarial party, presumed by the user of the invention.

In an embodiment, in particular in the case of protecting a site during an air attack, the data input step consists also of entering, during the implementation of the method, standard data at least of the attacker, detected for example for one or more radars.

Moreover, advantageously, the modelling step comprises:
a first sub-step consisting of generating a set of possible strategies using certain input data;
a second sub-step consisting of generating a game tree in the context of the game theory, on the basis of said set of strategies;
a third sub-step consisting of evaluating said game tree, using certain data from the input data.

Preferably, the third sub-step consists, on the basis of strategy pairs, of evaluating an attacker strategy and defender strategy pair, and of allocating a value to the attacker and a value to the defender.

Furthermore, advantageously, the resolution step comprises:
a first sub-step consisting of streamlining the game tree received, on the basis of data relating to threats, so as to form a reduced game tree; and
a second sub-step consisting of determining the game balance, on the basis of this reduced game tree, to deduce from it an attacker strategy and defender strategy pair.

Preferably, the first sub-step also uses detected standard data, entered during the implementation of the method, to streamline the game tree received.

Moreover, advantageously, the interpretation step comprises:
a first sub-step consisting of interpreting the optimal attack solution; and
a second sub-step consisting of interpreting the optimal defence solution best suited to this optimal attack solution making it possible to define the engagement rules of the defender.

In addition, advantageously, the interpretation step also comprises:
a sub-step of evaluating the level of danger of the threat; and/or
a sub-step of evaluating the probability of success of the optimal attack solution and the probability of success of the optimal defence solution.

The method according to the invention can be used in various applications in the military field.

In a preferred application of the prediction method, the defender data relates to a site on the ground to be protected, provided with defence capacities, and defender data relates to an air attack of said site on the ground to be protected and comprising detected standard data.

Advantageously, the method can be applied to at least one of the following situations, relating to a military conflict scenario:
an air defence;
an air combat, defensive or offensive;
a mission plan to hit targets.

The present invention also relates to a device for predicting an optimal attack solution and a corresponding optimal defence solution, in a military conflict scenario at least potentially between an attacker and a defender.

According to the invention, said device comprises:
a data input assembly, configured to enter, at least initially before the implementation of the method, both attacker data relating to attack models, and defender data relating to at least one zone to be defended and to available defence means;
a modelling unit configured to generate a game tree evaluated on the basis of said input data in the context of the game theory;
a resolution unit configured to define a game balance in the context of the game theory, a balance defining an attacker strategy and defender strategy pair;
an interpretation unit configured to determine, on the basis of the game balance, an optimal attack solution and an optimal defence solution, best suited to this optimal attack solution; and
a unit for transmitting information configured to transmit to an operator or a user system, at least said optimal attack solution and said optimal defence solution.

In a specific embodiment, the data input assembly comprises at least some of the following elements:
an input element making it possible for an operator to input data to be entered;
a data loading element associated with a memory and configured to load data into said memory.

Furthermore, advantageously, the device comprises at least one detector, for example a radar, capable of detecting standard data relating to an attack means of an attacker, and the data input assembly comprises a connection for transmitting data making it possible to automatically enter standard data detected by the detector.

A preferred application of the present invention is to predict the defence tactic of a site comprising zones to be protected such as buildings and defence means forming part of an air defence weapons system and comprising, for example, missile defence missiles or other air defence means, during an air attack of the site by an attacker.

The figures of the appended drawing will make it clear, how the invention can be achieved. In these figures, identical references designate similar elements.

Figure 1:
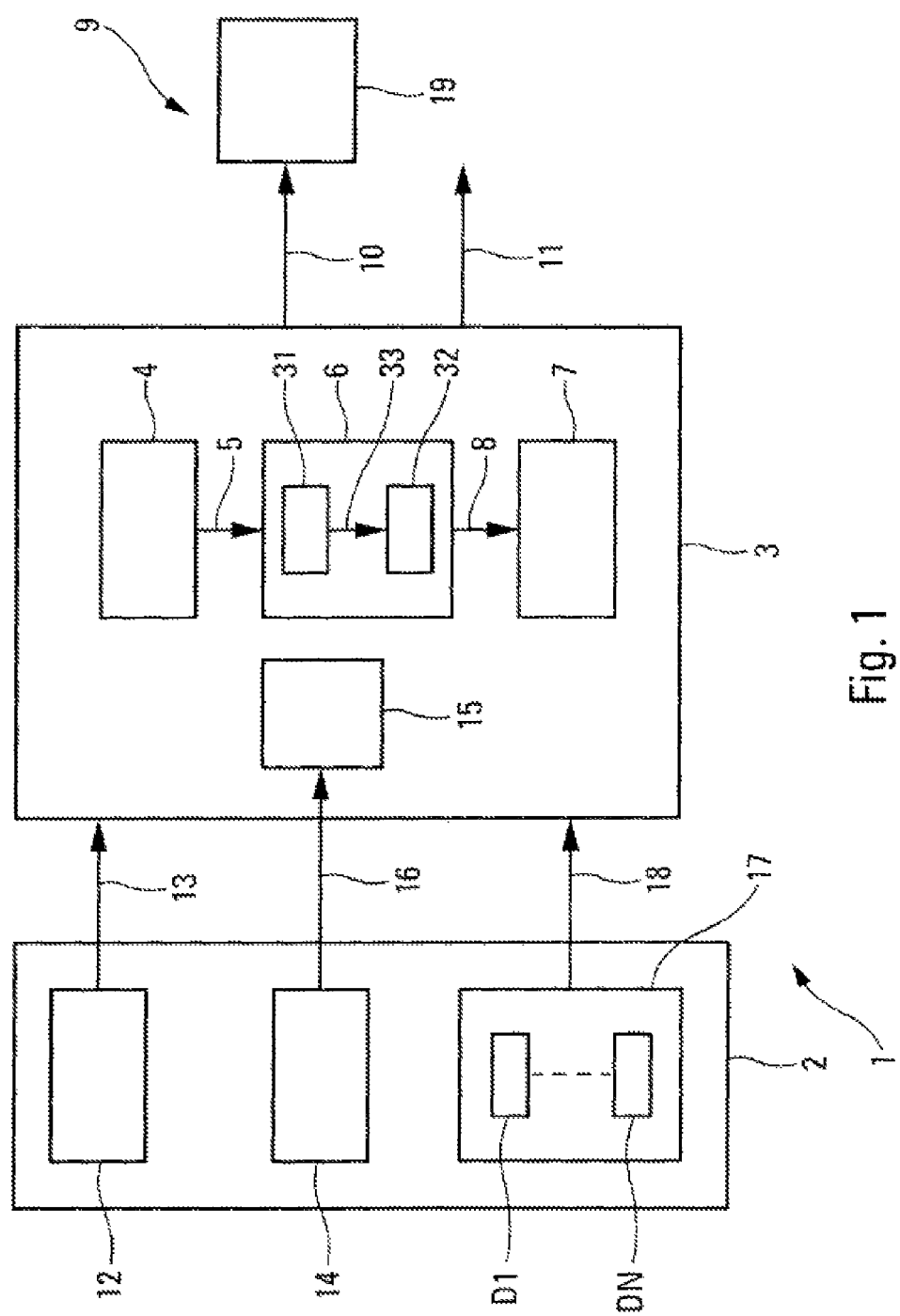
FIG. 1 is a synoptic diagram of a prediction device according to the invention.
Figure 4:
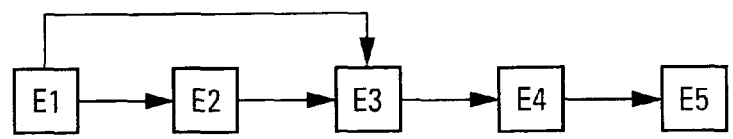

FIG. 4 schematically shows the steps of a method implemented by the prediction device of FIG. 1.

Figure 5:
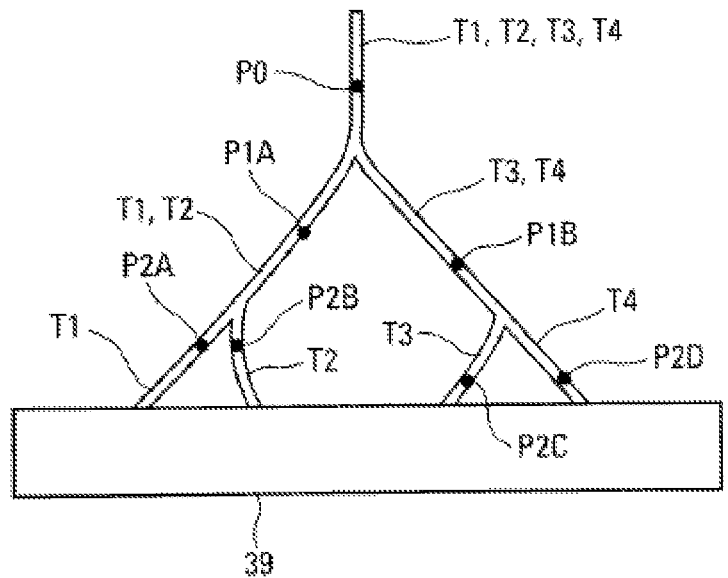

FIG. 5 illustrates a simplified attack scenario.

Figure 6:
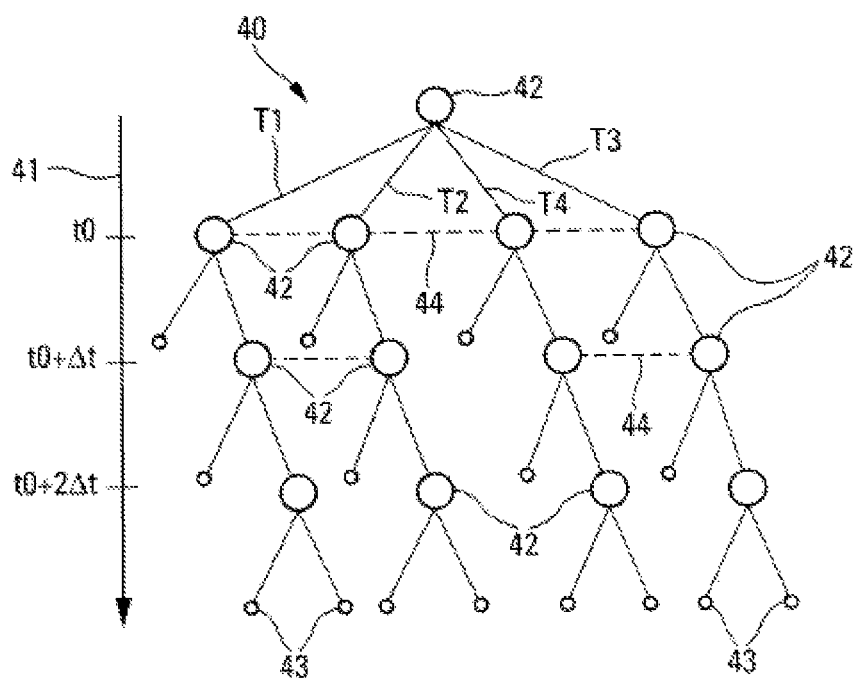

FIG. 6 illustrates a game tree associated with the simplified attack scenario of FIG. 5.

The device 1 which illustrates the invention and represented schematically in FIG. 1 is intended to predict at least one optimal attack solution and a corresponding optimal defence solution, in a military conflict scenario (at least potential, namely either effective, or considered) between at least one attacker and at least one defender.

According to the invention, said device 1 comprises:
a data input assembly 2 configured to enter into said device 1, as specified below, both attacker data relating to at least attack models (for example, attack weapons trajectories), and defender data relating to at least one zone to be defended and defence means available in this zone;
a central unit 3 comprising:
a modelling unit 4 configured to generate an evaluated game tree, using at least some of the input data by means of the data input assembly 2, said game tree being defined in the context of the game theory, as specified below;
a resolution unit 6 connected by way of a connection 5 to the modelling unit 4 and configured to define a game balance in the context of the game theory, a balance defining an attacker strategy and defender strategy pair;
an interpretation unit 7 connected by way of a connection 8 to the resolution unit 6 and configured to determine, on the basis of this game balance, an optimal attack solution and an optimal defence solution (namely best suited to this optimal attack solution); and an information transmission unit 9 configured to transmit at least said optimal attack solution and said optimal defence solution determined by the central unit 3, to an operator (by way, for example, of display means 19 which are connected by a connection 10 to the central unit 3 and which display this information on a screen) or to a user system (by way, for example, of a connection 11).

In a specific embodiment, the data input assembly 2 comprises:

an input element 12 making it possible for an operator to enter data, in particular manually, in the central unit 3 via a connection 13. This input element 12 can comprise a keyboard, a mouse, a touchpad, etc., or any other usual means, associated for example to a screen, which makes it possible for an operator to enter data in said device 1. This input element 12 can form, with the display means 19, a man/machine interface; and a data loading element 14 associated with a memory 15 and configured to load data into said memory 15, via a connection 16. This memory 15 can be integrated into the central unit 3, as in the example represented in FIG. 1, or external to the central unit 3 and connected to the latter.

Furthermore, the device 1 also comprises an assembly 17 of detectors D1 to DN, for example radars, N being an integer greater than 1. These detectors D1 to DN are capable of detecting standard data relating to an attack means (for example, a missile) of an attacker. In this case, the data input assembly 2 comprises a data transmission connection 18 making it possible to automatically enter into the central unit 3, standard data detected (or measured or determined) by at least one detector D1 to DN of the assembly 17.

The assembly 17 comprises at least one detector, such as a radar for example, which monitors the environment of the zone to be protected and which is capable of detecting threats and of transmitting corresponding information, in particular the position and the kinematics of the threats.

The attacker data, entered using the data input assembly 2, comprise at least some of the following data:

attack models comprising, in particular, the most probable attack procedures. An attack procedure can correspond to a sequence of concrete actions to lead an attack. A specific attack procedure can, in particular, be an attack trajectory;

types of threats and associated features (classification, weapons, etc.);

at least one detected appearance position of a threat;

at least one assumed appearance position of a threat; and preferences of the attacker, such as the cost of using each potential threat (ammunition) or the cost in case of interception by the defender.

Furthermore, the defender data, also entered using the data input assembly 2, comprise at least some of the following data:

possible missions (an attack of targets and of which targets (building, works, etc.) or a recognition mission, for example);

data of detectors D1 to DN or other detection means, and in particular radars;

features of detection means, for example, the frequency used by a radar;

positions of potential targets in the zone to be defended (buildings, radars, launchers, ammunition, etc.);

defence capacities of the zone to be defended (features of the launchers and available ammunition); and preferences of the defender, such as the firing cost of each ammunition or the tiering of the elements of the zone to be defended by order of importance.

The data input assembly 2 is configured to enter most data before the implementation of the prediction by the central unit 3. However, in a specific embodiment, in particular in the case of protecting a site during an air attack, the data input assembly 2 can also enter standard data during the implementation of the prediction method. It can in particular be standard data relating to the attacker, detected by at least one detector D1 to DN of the assembly 17, for example a radar, such as the standard path followed by a missile, a drone or a fighter aircraft.

Figure 2:
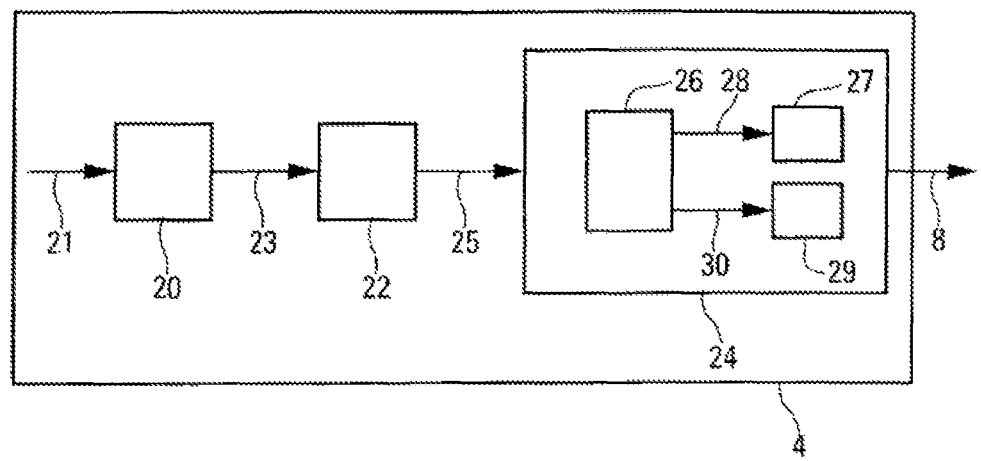
FIGS. 2 and 3 are synoptic diagrams of data processing units of the prediction device of FIG. 1.

Moreover, the modelling unit 4 comprises, as represented in FIG. 2:

a subunit 20 configured to generate a set of possible strategies using some of the data entered and received via a connection 21. It can, in particular, be at least some of the following data:

detection means data;

detection means features;

threat appearance positions;

potential missions and the features thereof;

procedure models, in particular trajectories, to be used; and threat types and the features thereof;

a subunit 22 connected to the subunit 21 by way of a connection 23 and configured to generate a game tree in the context of the game theory, on the basis of said set of strategies generated by the subunit 20, and other data such as potential missions and the features of the detection means; and a subunit 24 connected to the subunit 22 by way of a connection 25 and configured to evaluate said game tree, using some of the data entered, such as the features of the launchers and the ammunition.

The subunit 24 comprises, as shown in FIG. 2:

an element 26 configured to, on the basis of strategy pairs, evaluate at least one attacker strategy and defender strategy pair;

an element 27 connected to a connection 28 to the element 26 and containing a utility function to allocate a value to the attacker; and an element 29 connected by a connection 30 to the element 26 and containing a utility function to allocate a value to the defender.

Furthermore, the resolution unit 6 comprises, as shown in FIG. 1:

a subunit 31 configured to streamline the game tree received from the modelling unit 4, on the basis of additional data such as threats, as well as standard data, entered by an operator or received in real time of the assembly 17 of detectors and specifying for example, the standard threat positions. By this streamlining (or reduction), the subunit 31 forms a reduced game tree. The subunit 31 can therefore also use detected standard data, entered during the implementation of the prediction method, to streamline the game tree received; and a subunit 32 connected to the subunit 31 by way of a connection 33 and configured to determine the game balance, on the basis of this reduced game tree received from the subunit 31, in order to deduce from it an attacker strategy and defender strategy pair. The game balance can correspond to the Nash equilibrium or another usual balance.

Figure 3:
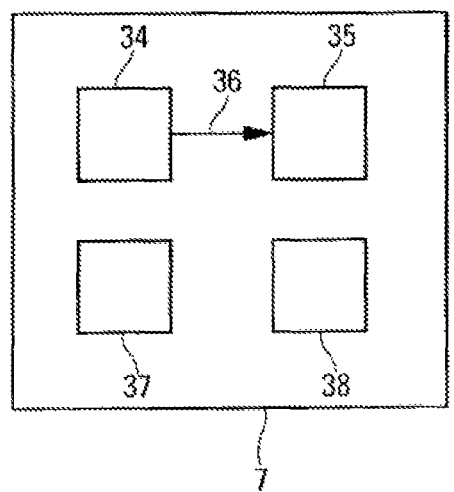

Moreover, the interpretation unit 7 comprises, as shown in FIG. 3:
- a subunit 34 configured to generate the optimal attack solution, on the basis of the game balance received from the resolution unit 6. This optimal attack solution defines probabilistic missions, and threat types and the probabilistic features thereof; and
- a subunit 35 connected to the subunit 34 by way of a connection 36 and configured to evaluate the level of danger of the threat.

In addition, the interpretation unit 7 also comprises:
- a subunit 37 configured to generate, on the basis of the game balance received from the resolution unit 6, the optimal defence solution best suited to said optimal attack solution, making it possible to define engagement rules of the defender; and
- a subunit 38 to evaluate the probability of success of said optimal attack solution and the probability of success of said optimal defence solution.

Predicting these optimal (attack and defence) solutions in the conflict scenario is based therefore on the resolution of a game theory problem.

The game theory can be defined as the theoretic context modelling the situations in which the optimal action (i.e. preferred action) for an officer depends on the anticipations that they form on the decision of the other officer. These two officers are the attacker and the defender in the context of the present invention.

In game theory, a game balance such as a Nash equilibrium is a situation in a game where no player has any interest in changing strategy. In this situation, all the choices made by several players, knowing their reciprocal strategies, have become stable because of the fact that none can be modified, only their strategy without weakening their personal position.

The game theory is an interacting decision theory. It studies situations where individuals make decisions, each being aware that the result of their own choice depends on that of the others.

A preferred application of the device 1, such as described above, aims to define the best possible defence strategy of a site to be protected, i.e. the optimal defence solution, during an air attack of this site, and in particular after the detection of the launch of a potential threat, such as the detection by a radar of a missile firing likely to reach the site of an approach of a drone, a fighter aircraft or a bomber aircraft.

Faced with such an attack, the command centre of the site to be protected therefore finds itself facing a technical problem, namely the problem of the defence means thereof, such as a missile defence missile, using against the missile which attacks them. This technical problem aims to defend at least the potential targets of the site, according to the defence means thereof and from what it known about the attack: isolated attack and directed towards which target, other possible attack, simple recognition mission for example in case of detecting an enemy aircraft. This prediction must also consider the possible costs: cost of ammunition used, cost of potential destruction, etc. The device 1 makes it possible to receive the data to be processed, as well as in both before the implementation of the prediction method and during this implementation.

To determine the optimal defence solution, an operator enters therefore beforehand in the device 1 (using the data input assembly 2), all known data relating to the attacker or to the potential attackers and the data relating to the defender (i.e. relating in particular to the features of the site to be protected and to the weapons systems present and capable of being used to protect the site). Standard data relating to detections in real time, such as a new missile firing, or an updated position of the missile detected beforehand, can also be entered (using the data input assembly 2), as soon as they are known. The prediction device 1 determines in this preferred application, an optimal defence solution consisting of defining an engagement proposition.

An engagement proposition can comprise an optimal allocation plan which specifies an allocation of weapons of the site to be defended and provides firing instants or dates of these weapons to destroy the threats, with the aim of best allocating the available resources to deal with threats by maximising the hope of survival of the strategic points defended.

The device 1, such as described above, is intended to implement a method for predicting an optimal attack solution and a corresponding optimal defence solution, in an at least potential military conflict scenario between an attacker and a defender.

As shown in FIG. 4, this prediction method comprises:
- a data input step E1, implemented by the data input assembly 2, consisting of entering into the central unit 3 of the device 1, at least initially before the implementation of the method and possibly during the method, both attacker data relating to at least the attack models, and defender data relating to at least one zone to be defended and available defence means;
- a scenario modelling step E2, implemented by the modelling means 4, consisting of generating a game tree evaluated on the basis of said data entered in the context of the game theory;
- a resolution step E3, implemented by the resolution unit 6, consisting of defining a game balance in the context of game theory, for example using standard data entered;
- an interpretation step E4, implemented by the interpretation unit 7, consisting of determining, on the basis of the game balance defined in step E3, at least one optimal attack solution, as well as an optimal defence solution, best suited to this optimal attack solution; and
- an information transmission step E5, implemented by the information transmission unit 9, consisting of transmitting to an operator and/or to a user system, at least said optimal attack solution and said optimal defence solution.

The method according to the invention thus makes it possible to predict an optimal defence solution if it is placed on the side of the defender, and an optimal attack solution if it is placed on the side of the attacker.

In the context of the present invention, the decision-makers (attacker and defender) are assumed VNM-rational (Von-Neumann/Morgenstern). It is thus placed in the context of expected utility theory where it is known to express the preferences of a decision-maker in the presence of random events. It is known to define a function (called utility) which, to an alternative for the decision-maker, associates a real number and gives, through these means, preference levels between the different alternatives. The objectives of the attacker and of the defender are therefore to maximum the respective utility functions thereof.

The problem is thus modelled like a sequential game (the decisions follow sequentially) with two players, the attacker (the threats are shown as one single player which corresponds to the decision/planning echelon of the attack tactic used) and the defender (a C2 system, for example). The game is modelled as:

Bayesian: the players do not know all the parameters of the game that they are playing. In particular, the defender does not know the missions of the attackers, and the attackers do not necessarily know the configuration of the defence system;

with imperfect information: the defender has no information of the decisions made by the attacker during the mission preparation;

with perfect memory: the players have the history of their decisions made; and with unlimited rationality: the players are not limited in terms of calculation complexity. The decisions of the attacker are not influenced by the information received during the attack, i.e. that the attack is considered as planned in advance during the mission preparation and no longer changes.

A game solution is sought, i.e. a probabilistic strategy pair for each player. The game is resolved in particular by calculating a balance of the "semi-proper quasi-perfect equilibrium" type, which is a refining of the Nash equilibrium suited to the modelling.

Procedures can be extracted from the strategy of the attacker, for example trajectories, possible attacks, as well as missions and classifications of plausible threats. The solution of the game found makes it possible to also obtain one or more potential defence strategies for the system C2, i.e. one or more firing solution suited to the attack scenario.

As an illustration, in FIG. 5, a possible and very simplified graphic representation of such a game is shown, that can be considered by the device 1, comprising the following theories.

It is assumed that the attacker has the choice between different trajectories. These trajectories are discretised. Numerous other potential features of the attack can also be represented: the choice of the mission (target building, recognition mission, etc.) or the classification of threats (drone, fighter aircraft, etc.) are non-exhaustive examples of it. The actions of the defender are also discretised. At regular time intervals, the defender receives measurements from detectors, for example, of the assembly 17 of the device 1. He thus has the possibility of engaging an attacker by triggering a shot before receiving a new measurement or it has the possibility to wait.

In the example of FIG. 5, it is considered that there is one single track (i.e. one single attacker), one single launcher (one single possible firing decision, but on several possible dates), and one single objective (or target) 39.

Regarding the trajectories T1, T2, T3 and T4, they are considered as possible for the attacker to achieve the objective 39. In FIG. 5, the following has been shown:

a position P0 to a time t0, not making it possible to discriminate the trajectories T1 to T4;

two positions P1A and P1B at a time t0+Δt making it possible to discriminate on the one hand, the pair of trajectories T1 and T2 and on the other hand, the pair of trajectories T3 and T4; and four positions P1A, P1B, P2C and P2D at a time t0+2Δt to the approach of the objective (or target) 39, forming part respectively of the trajectories T1, T2, T3 and T4.

The game associated with this scenario of FIG. 5 is shown in the form of a game tree 40 in FIG. 6, to which a time scale 41 is associated.

On this game tree 40, the large circles 42 represent the decision nodes of the attacker and of the defender. The small circles 43 represent the end nodes. The attacker has the choice between four trajectories T1, T2, T3 and T4. The defender has no information about these trajectories but receives the measurements from the detectors, which makes it possible to conject these trajectories. They make the decision to fire (or not) upon each receipt of measurement(s) of a detector.

The horizontal dotted lines 44 indicate that the connected decision nodes cannot be distinguished by the defender. At t0, the path of the attacker is not known. Therefore, from their standpoint, the decision is the same as for the four nodes. They have no information making it possible to distinguish them.

At t0+Δt, after receipt of a measurement, the defender is capable of firing a first shot over the possible trajectories (between T1 and T2 on the one hand, and T3 and T4 on the other hand).

At the level of the end nodes, the players have made all of their decisions, and the utility functions of the attacker and of the defender can therefore be calculated.

The method implemented by the device 1 considers numerous elements to predict the optimal attack solution of the attacker and deduce from it the most suited optimum defence solution. Beyond the threat trajectories, the features thereof are also evaluated.

Applying the game theory to the problem of defending a system C2 makes it possible to consider all the information the defence has. In particular, the knowledge of the operator is integrated into the procedures, in particular the trajectories, studied to model the attack and in the probabilities associated with these procedures or trajectories upstream of the resolution of the game (belief, a priori). The prediction is thus refined by considering the expertise of the operator on the mission and the classification of the threat, since the prediction method makes the distinction of the potential targets of the attack possible according to the importance thereof. It also gives the possibility to the operator to inform about the probable features of the threat considered. It also makes it possible for the operator to enter the information of which they could be aware, moreover and which makes it possible for them to favour certain theories.

The integration of this knowledge to the algorithms used by the central unit 3 makes it possible for a very good interaction of the operator with the device 1.

The prediction method makes it possible to represent attack strategies to best utilise them. It can manage attack scenarios of a zone by several simultaneous threats, instead of considering each threat individually. Starting with the principle that one single command centre has ordered the attack, the procedures (trajectories, for example) of the threats are not independent, and have been chosen voluntarily. The attacks of these threats are coordinated together. This approach predicts the procedures (trajectories, for example) of these threats simultaneously, by considering this dependence.

The prediction method also utilises the appearance position notion (i.e. the position at which each threat is detected the first time). During an attack, the appearance position of a threat is not insignificant. The central unit 3 interprets the fact that the attacker has chosen one position rather than another, which makes the prediction more realistic, since this choice gives information about the objective of the attacker.

The prediction method makes it possible, not only, to predict the path of a threat, but it also associates probabilities with other elements. To best represent the problem, the different possible missions and the potential threat classifications of the defender, the device 1 deduces the future path of a threat, and also evaluates the target of the attack, as well as the features of the threat such as the nature thereof and the weapons thereof.

The device 1 and the prediction method, such as described above, are preferably implemented to protect a zone of an air attack as indicated above, but they can be extended using a deployment. Indeed, the effectiveness of two deployments can be compared facing an air-type attack by comparing the values obtained for the utility of the defender in each deployment.

Furthermore, this device 1 and this method can be used as an aid to mission planning. It is sufficient, in this case, to be placed from the standpoint of the attacker, by implementing the abovementioned operations, and to consider the known or assumed data, of which the attacker has on the two protagonists.

While determining the best attack solutions of the enemy, the device 1 calculates the best defence solution(s), in the form of a sequence of decisions. The properties of the balance make the attack and defence solutions thus calculated are the best possible for the two actors. This approach can be generalised to numerous systems using the decision in the military field, in particular the planning and mission conducting systems used in the weapons systems or even in the military staffs, or the systems for preparing military operations, to the tactic or even strategic echelon.

As used in this disclosure, the central unit 3, modelling unit 4, modelling means 4, resolution unit 6, interpretation unit 7, information transmission unit 9, data loading element, elements, subunits, and data processing units, may each include one or more processors (e.g., general processing units, graphical processing units, application specific integrated circuits); data stores; and modules that may be implemented as software logic (e.g., executable software code), firmware logic, hardware logic, or various combinations thereof, and may further include one or more of a transmitter, a receiver, a transceiver, or similar devices that may be configured to utilize one or more wireless communication standards, e.g., WIFI®, WIMAX®, BLUETOOTH®, ZIGBEE®, Cellular, Infrared, Near Field Communication (NFC), etc. or similar standards. As used herein in the context of communications, a connection (such as a data transmission connection) may include communicative, electromagnetic, magnetic, ultrasonic, optical, inductive, electrical, capacitive, and similar connections.

Devices disclosed herein utilize circuitry in order to implement technologies and methodologies described herein, operatively connect two or more components, generate information, determine operation conditions, control an appliance, device, or method, and/or the like. Circuitry of any type can be used. In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

In an embodiment, circuitry includes one or more ASICs having a plurality of predefined logic components. In an embodiment, circuitry includes one or more FPGA having a plurality of programmable logic components. In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like. In an embodiment, circuitry includes a baseband integrated circuit or applications processor integrated circuit or a similar integrated circuit in a server, a cellular network device, other network device, or other computing device. In an embodiment, circuitry includes one or more remotely located components. In an embodiment, remotely located components are operatively connected via wireless communication. In an embodiment, remotely located components are operatively connected via one or more receivers, transmitters, transceivers, or the like.

In an embodiment, the device includes one or more data stores that, for example, store instructions or data. Non-limiting examples of one or more data stores include volatile memory (e.g., Random Access Memory (RAM), Dynamic Random Access Memory (DRAM), or the like), non-volatile memory (e.g., Read-Only Memory (ROM), Electrically Erasable Programmable Read-Only Memory (EEPROM), Compact Disc Read-Only Memory (CD-ROM), or the like), persistent memory, or the like. Further non-limiting examples of one or more data stores include Erasable Programmable Read-Only Memory (EPROM), flash memory, or the like. The one or more data stores can be connected to, for example, one or more computing devices by one or more instructions, data, or power buses.

In an embodiment, circuitry includes one or more computer-readable media drives, interface sockets, Universal Serial Bus (USB) ports, memory card slots, or the like, and one or more input/output components such as, for example, a graphical user interface, a display, a keyboard, a keypad, a trackball, a joystick, a touch-screen, a mouse, a switch, a dial, or the like, and any other peripheral device. In an embodiment, circuitry includes one or more user input/output components that are operatively connected to at least one computing device (electrical, electromechanical, software-implemented, firmware-implemented, or other control, or combinations thereof).

In an embodiment, circuitry includes a computer-readable media drive or memory slot configured to accept signal-bearing medium (e.g., computer-readable memory media, computer-readable recording media, or the like). In an embodiment, a program for causing a system to execute any of the disclosed methods can be stored on, for example, a computer-readable recording medium (CRMM), a signal-bearing medium, or the like. Non-limiting examples of signal-bearing media (e.g., a data loading element) include a recordable type medium such as any form of flash memory, magnetic tape, floppy disk, a hard disk drive, a Compact Disc (CD), a Digital Video Disk (DVD), Blu-Ray Disc, a digital tape, a computer memory, or the like, as well as transmission type medium such as a digital and/or an analog communication medium (e.g., a fiber optic cable, a waveguide, a wired communications link, a wireless communication link (e.g., transmitter, receiver, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

The invention claimed is:

1. A device for predicting an optimal attack solution and a corresponding optimal defense solution, in a potential military conflict scenario between an attacker and a defender, comprising:
   a data input assembly configured to input into said device attacker data and defender data, the defender data relating to a ground site to be protected and provided with defense capacities, the attacker data relating to an air attack of said ground site and comprising detected standard data,
      the attacker data comprising at least one of the following data:
         an attack procedure model;
         a threat type;
         a detected appearance position of a threat;
         an assumed appearance position of a threat; or
         a preference of the attacker,
      the defender data comprising at least one of the following data:
         a possible mission;
         a detection means data;
         a detection means feature;
         a potential target position in the ground site to be defended;
         a defense capacity of the ground site to be defended; or
         a preference of the defender;
   a central unit comprising:
      a modelling unit configured to generate a game tree on the attacker data and defender data, and based on game theory;
      a resolution unit configured to define a game balance based on game theory, the game balance defining an attacker strategy and defender strategy pair;
      an interpretation unit configured to determine, based on the game balance, an optimal attack solution and an optimal defense solution;
   a detector configured to detect standard data relating to an attack means of the attacker; and
   an information transmission unit configured to transmit at least the optimal attack solution and the optimal defense solution to an operator or a user system,
   wherein the data input assembly comprises a data transmission connection configured to automatically enter the standard data detected by the detector.

2. The device according to claim 1, wherein the data input assembly comprises at least one of:
   an input element configured to enable an operator to enter data; or
   a data loading element associated with a memory and configured to load data into said memory.

3. The device according to claim 1, wherein the detector is a radar.

4. The device according to claim 1, wherein the information transmission unit comprises:
   a display connected to the central unit; or
   a connection configured to transmit, at least said optimal attack solution and said optimal defense solution, to a user system.

5. The device according to claim 1, wherein the optimal defense solution comprises defining an engagement proposition comprising an optimal allocation plan which specifies an allocation of weapons of the ground site and provides dates for firing the weapons to destroy the threat, based upon a maximized probability of survival.

6. The device according to claim 1, wherein the attack means is a missile.

* * * * *